United States Patent [19]

Krause

[11] 4,359,280
[45] Nov. 16, 1982

[54] PROCESS AND SYSTEM FOR VARIABLE CONTRAST COLOR PHOTOGRAPHIC IMAGING

[76] Inventor: Peter Krause, 50 Cedar Dr., Allendale, N.J. 07401

[21] Appl. No.: 172,507

[22] Filed: Jul. 28, 1980

[51] Int. Cl.³ .................................. G03B 27/73
[52] U.S. Cl. .................................. 355/37; 355/77; 430/506; 430/357
[58] Field of Search .................. 355/32, 35–38, 355/77; 430/503, 506, 504, 14, 15, 357, 359, 293

[56] References Cited

U.S. PATENT DOCUMENTS 3,085,468  4/1963  Hehn ........................... 355/35
3,469,914  9/1969  Thomson ....................... 355/35 X
3,923,394  12/1975  Frankiewicz ..................... 355/37
4,230,795  10/1980  Krause ......................... 430/503

Primary Examiner—G. Z. Rubinson
Assistant Examiner—W. J. Brady
Attorney, Agent, or Firm—Sprung, Horn, Kramer & Woods

[57] ABSTRACT

A color photographic imaging process and system uses a photographic film and/or printing paper wherein blue, green and red light is radiated on corresponding yellow, magenta and cyan dyes to obtain an image and the peak transmittances of the blue, green and red light are modulated to vary the resulting contrast of the color image.

14 Claims, 11 Drawing Figures

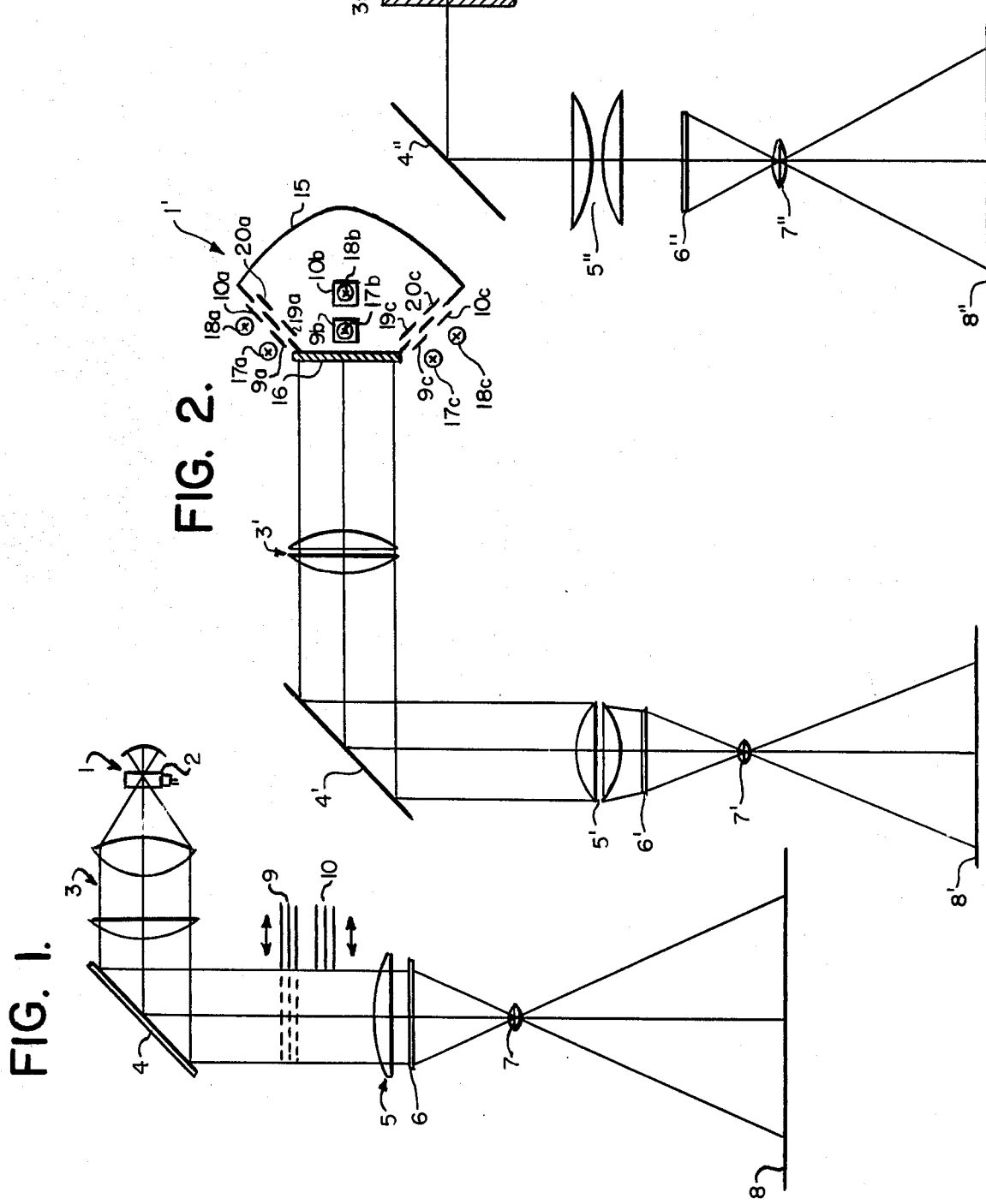

PROCESS AND SYSTEM FOR VARIABLE CONTRAST COLOR PHOTOGRAPHIC IMAGING

BACKGROUND OF THE INVENTION

The present invention relates to a color photographic imaging process and system and more specifically to a system wherein the resulting contrast of the image is variable.

The contrast and density range of photographic camera film images can and do vary considerably due to differences in:

1. the light modulating properties of objects in the scene being photographed
2. atmospheric conditions which affect the degree of diffusion of direct sunlight and skylight
3. the color quality and distribution of the light illuminating the objects
4. the spatial arrangement of the objects and the resulting pattern of light and shade
5. the properties of the optical components of the camera
6. the response characteristics of the photographic film
7. the chemical development employed for the creation of the photographic image.

In black-and-white photography a negative camera film is normally converted to a positive reflection print image on a paper support. Compensation is made in the printing step for the variations in negative image contrast and density range through the use of one of two types of printing papers. The first type known as graded paper type, consists of several members of the same basic design which differ primarily with respect to the exposure scale, or contrast. The proper matching of film image density range and paper grade, or contrast, yields a final print image which has the necessary and desired range of tones from white to black. Depending on the kind of photographic work, as many as six different paper grades may be required in order to ensure satisfactory final image quality as regards tone reproduction.

The second type of black-and-white paper is known as variable-contrast paper. Such papers are supplied in a single grade of contrast which can be varied, however, through changes in the color quality of the printing light. As a rule variable contrast printing papers have a shorter exposure scale, and a high inherent contrast, when exposed by blue light than when exposed by green light. Intermediate levels of contrast are obtained by appropriate mixtures of blue and green light. The total range of contrast obtainable with variable-contrast papers is somewhat smaller than that provided by a full graded series of papers, but the convenience and the economic benefits of using a single unit variable-contrast material are so great that about 50% of all users in the United States prefer the variable-contrast type of material. In any event, the need for different contrast levels is clearly recognized and served in black-and-white photography.

In color photography the same problem exists, of course, since the same kind of cameras are used for color as for black-and-white picture taking and since the same type of scenes are photographed with color as with black-and-white films under similar lighting conditions. The addition of hue and chroma to the image does reduce the importance of tone-reproduction somewhat in color as compared to black-and-white photography, but good tone rendition still accounts for about 70% of the total quality of color images. However, because color photographic processes are much more complex than black-and-white it has not been practical to supply color printing papers in more than one contrast grade. Some differences in inherent contrast are found between color papers intended primarily for the printing of amateur color film images in photofinishing laboratories and those aimed at the professional market sector, but by large color papers have been single-contrast materials. Consequently, there has been a quality problem with color prints made by a straight printing procedure.

SUMMARY OF THE INVENTION

The main object of the present invention is to provide a color photographic imaging process and system of the type using at least one of photographic film and printing paper, wherein blue, green and red light is radiated on corresponding yellow, magenta and cyan dyes of the film image and wherein the peak transmittance of the blue, green and red light is modulated to vary the resulting contrast of the image.

The contrast control in the color printing process and system is effected through the exploitation of the light modulation characteristics of the dyes used in color film images and in printing paper. The yellow, magenta and cyan dyes typically used in color films to form the photographic image, absorb light preferentially in different regions of the visible spectrum with peak absorbtance in the desired blue, green and red portions. The three corresponding image forming layers of the color printing paper contain sensitizing dyes which have peak sensitivity in the region of highest absorbtance of the film dyes, and the matching of the film and paper characteristics conforms with the principles of tri-chromatic color reproduction which depends upon the efficient analysis and synthesis of all object colors in terms of their blue, green and red content.

However, the amount of light absorbed by each of the three dyes in the film varies with the wavelength of the light. For example, a cyan dye can have a density of 0.9 at wavelength 625 nm but of only about 0.8 at wavelengths 645 or 605 nm or of only about 0.6 at wavelengths 665 or 590 nm.

In a photographic image the concentration of the yellow, magenta and cyane dye varies from zero to the maximum fixed by the dye content of each layer depending on the variations in blue, green and red light exposure received by the film at any point of the camera image. Thus, if a red wedge were photographed on a color negative film, the resulting complementary cyan dye image would absorb much red and little blue or green light. Furthermore, within the wavelength region of main absorption the apparent contrast of the wedge image would vary with wavelength of light by which the cyan dye density would be measured or examined. The net result being that the contrast of the cyan wedge image varies depending on the color distribution of the light by which it is sampled. A different gradient or contrast of such a cyan wedge image is obtained when measured at wavelength 625 nm and at wavelengths 645 or 605 nm or at wavelengths 665 or 590 nm.

It will be apparent from this example that the effective printing contrast of a three-color photographic film image can be varied by altering the spectral distribution of the printing light so that the peak intensity of the blue, green and red light components co-incides or deviates more or less from the peak density regions of the yellow, magenta and cyan film image dyes. The process and system of the present invention utilizes this property for varying the contrast of the final print image as set forth hereinafter.

The modulation can be carried out in a color printer equipped with pairs of blue, green and red filters, one set of three having peak transmittances in the region of peak density of yellow, magenta and cyan film dyes, and the other filter set having peak transmittances in regions where the film dye absorptions are lower, for example, 75% of the peak absorption. In printing the light permitted to fall on the film image could be a mixture of the filter pairs or the exposure could be made sequentially through one and the second set. Gradual changes in contrast could be obtained by stepped increments which would vary from the maximum to the minimum value of the system.

Alternatively, three dichroic filters may be used which will transmit different portions of the incident light depending upon their orientation to the light beam. Thus the transmitted portion of the beams will shift torward a longer wavelength as each filter is tilted. For example, a tilt of about 5° to 10° will cause a shift in the peak transmittance of about 20-25 nm.

A still further means for modulating comprises using complimentary filter pairs for each color to form a notch filter for each color which removes a narrow band of wavelengths from the transmitted light at the peak of absorption to the yellow, magenta and cyan image dyes. For example, a combination of properly designed blue-green and orange filters can but out a wavelength band from 500 to 545 nm where a typical magenta film dye has its peak absorption. Equivalent pairs of blue and yellow filters and cyan and red filters will achieve the corresponding notches in the peak absorption bands of the yellow and cyan image dyes, respectively.

The intensity of the light transmitted by each filter could be adjusted so as to maintain a constant print exposure time regardless of the color mixture. Moreover, the setting of the filters could be calibrated in terms of print image contrast so that the user could select the preferred contrast value.

A color film material is provided having two blue, two green and two red sensitive layers each containing a dye of different peak density. Thus two different yellow dyes would be employed, one incorporated in one blue sensitive layer and the other in the second blue sensitive layer. The two layers of each pair would have different inherent contrast. In printing one or the other dye image would be sampled, or combinations of the two, through use of color printing filters whose transmittances are matched with the peak densities of the film dyes.

The same film construction as noted above could be used in combination with a printing paper equipped with double layers. The sensitivities of these layers would be adjusted to match the film dye peaks. One of the print material layers would have low contrast, the other high contrast. Adustments in the color distribution of the printing light would then control the contrast of the print image. Alternatively, the printing paper could be used with ordinary film.

These and other objects of the present invention will be explained in more detail hereinafter with reference to the attached drawings wherein:

BRIEF DESCRIPTION OF THE DRAWINGS

FIG. 1 is a schematic representation of a printer according to the present invention;

FIG. 2 is a schematic representation of another printer according to the invention;

FIG. 3 is a schematic representation of a further printer according to the invention;

DETAILED DESCRIPTION OF THE INVENTION

Figure 4:
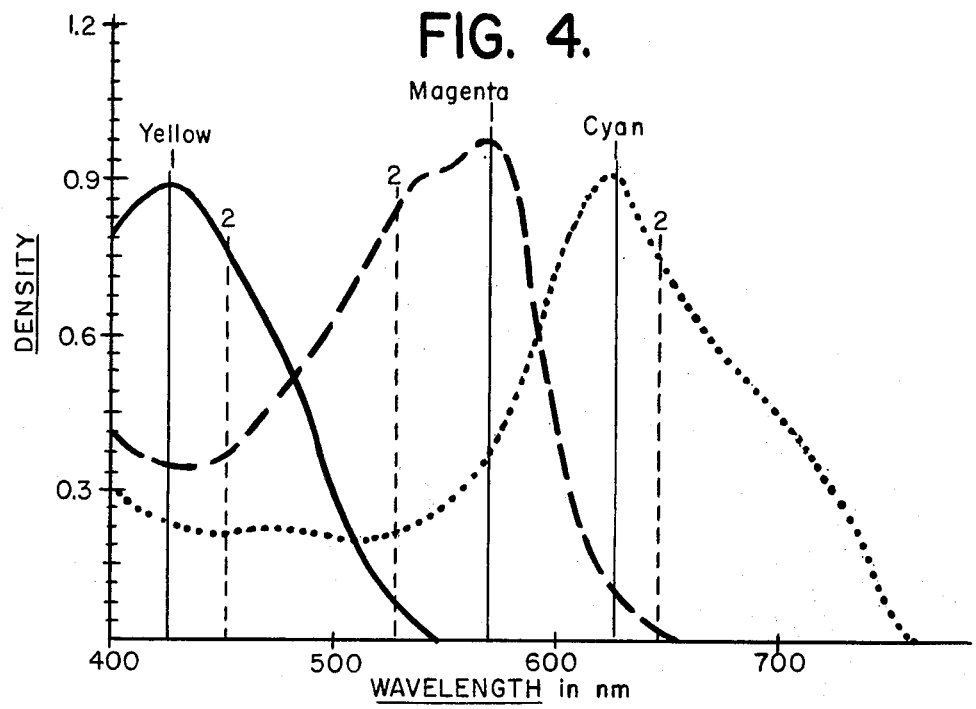
FIG. 4 is a graphic representation of the spectral density curves for film dyes with light modulation according to the present invention.

FIG. 1 shows a color printer according to the present invention which is equipped with a light source 1 including a lamp 2 which radiates ordinary white light. The radiated light is first passed through a condensor 3 reflected on a mirror 4 and then through a second condensor 5 which directs the light onto negative 6 thereafter through projection lens 7 and onto printing paper 8. In these respects, the printer is similar to conventional printers which are currently available on the market. These conventional printers include one set of red, green and blue filters 9 which are slidably diposable into the beam path to effect the printing as desired. In accordance with the present invention, a second set of red, green and blue filters 10 are also provided. Whereas the first set 9 have their peak transmittances in one region, the other set 10 has their peak transmittances in another region. While it is apparent to those skilled in the art that other integral multiples of three filters can be utilized in accordance with the invention wherein a greater degree of control is to be exercised, for the sake of clarity, the present embodiment utilizing 6 filters is set forth as an example.

Figure 5:
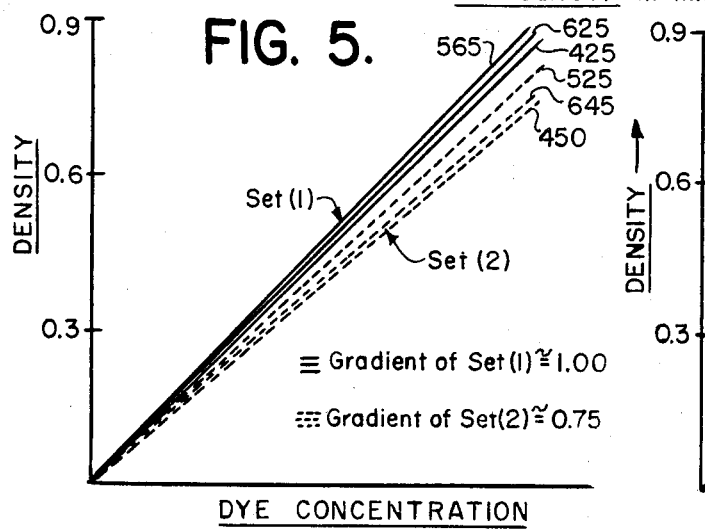
FIG. 5 is a graph representation of variable contrast produced by light modulation according to the invention.

In the process according to the present invention, the printer according to the present invention is capable of achieving variable contrast as is illustrated in FIGS. 4 and 5. If for example the first set of filters 9 have peak transmittances at wavelengths 425, 565 and 625 nm and the second set of filters 10 have their peak transmittances at 450, 525 and 645 nm, FIG. 4 shows the resulting densities which are achieved by the modulated peak transmittances for typical spectral densities of a dye set used in color photographic materials. As is clearly seen therein, the first set of filters samples the spectral densities of the dye sets at their peaks, while the second set of filters 10 samples the spectral densities at points which are approximately 15% lower than the peak densities.

As a result, as can be seen from FIG. 5, the contrast of the image formed by the yellow, magenta and cyan dyes when measured or printed with light of wavelengths 425, 565 and 645 nm compared to that printed with wavelengths of 450, 525 and 645 nm produces a gradiant ratio of 1.00 to 0.75 and thus a wide range of control over the contrast of the image formed.

Figure 6B:
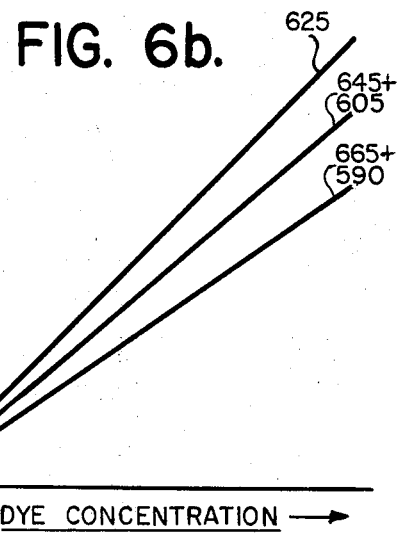
FIGS. 6a and 6b are further graphic representations of the effect of light modulation for a cyan dye image according to the present invention.
Figure 6A:
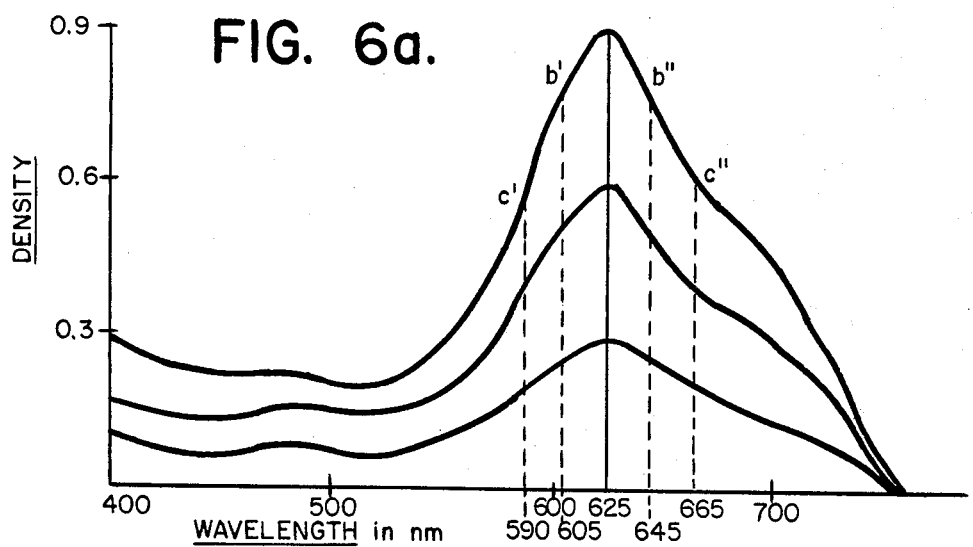

While the above example illustrated an embodiment wherein one filter set was matched to the peak absorption points of color film dyes, the result of the modulation of the light source on color film dyes is illustrated in more detail in FIGS. 6a and 6b which shows the results of the modulation for the cyan dye.

FIG. 6a shows the density at different wavelengths for three different concentrations of a cyan film dye, while FIG. 6b shows the graphic representation of density versus concentration for five different wavelengths. As can be clearly seen, the densities of the dye at 625 nm at the peak absorption level produces a contrast of 1.00, while the densities of the dye at 605 and 645 nm (corresponding to points b' or b" respectively) produced a contrast of 0.84. At wavelengths 590 and 660 nm (corresponding to points c' and c") which have densities producing a contrast of about 0.70. Thus by sampling the different points along the absorption curves of the film dyes, light modulating means can control the contrast of the resulting image.

It is clear that the light modulation can be carried out through mixtures of beams transmitted by pairs or multiple filters or, the intended contrast control can be obtained by the sequential irradiation of the film image with light that has passed through one or both of the filters for each color. Gradual changes in contrast can be obtained such as step increments where a number of filters are provided for each color.

FIG. 2 is another embodiment showing a color filter of a conventional type which is modified to use the method and system according to the present invention.

The printer includes a light source 1' which rather than providing ordinary white light, provides the modulated light for use in printing. The modulated light is received at condensor 3' and is reflected by mirror 4' through second condensor 5' onto the negative 6' through a projection lens 7' and onto printing paper 8'. In accordance with the present invention, the light source 1' includes a conventional light mixing chamber 15 which has a semispherical configuration and which includes a diffuser 16 in order to make the output of the light mixing chamber uniform.

In order to obtain the desired modulated light, green, red and blue filters 9a-9c and 10a-10c are provided at apertures in the chambers and have lamps 17a-c and 18a-c respectively radiating ordinary white light thereon. By the use of shutter blades 19a-c and 20a-c to open and close the apertures in the light mixing chamber 15, the desired wavelength transmittances can be mixed and irradiated on the negative and thereafter the printing paper. The filters 9a-c and 10a-c are equivalent to those set forth in the embodiment described with respect to FIG. 1.

FIG. 3 shows another embodiment of a printer according to the present invention wherein a light source 1" directs already modulated light, similar to that of the embodiment of FIG. 2, onto mirror 4" which thereafter reflects light through condensors 5" onto negative 6" through projection lens 7" and onto printing paper 8".

The light source 1" according to this embodiment comprises three lamps 30a-c which irradiate ordinary white light onto condensor lenses 31a-c respectively. For each lamp, there is provided a rotatable filter 32a-32c which rotates about a central axis in order to put either one or another filter in the beam path for the given lamp. In this embodiment, the filters which are rotatable into the beam path are equivalent to the two sets of filters provided in the embodiment of FIG. 1. The filters are followed by rotatable shutter blades 33a-c which act to permit or block the light transmitted through the filters onto beam splitter mirrors 34. By the use of the conventional beam splitter mirrors, light from the three sources is directed onto diffuser 35 which thereafter is directed onto the print paper in the manner heretofore described.

Figure 8:
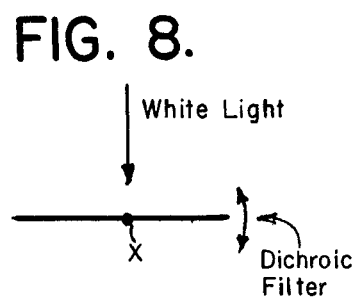
FIG. 8 is a schematic representation of a dichroic filter for light modulation according to the invention.

In an alternative embodiment for each of FIGS. 1-3, instead of two filter sets for the three colors, a single set of three dichroic filters, each filter capable of transmitting two colors of the three, may be used to transmit different portions of the incident light depending upon its orientation with respect to the light beam projected thereon. As shown in FIG. 8, each dichroic filter would be mounted for rotation about an axis X so that the orientation of the filter with respect to the light beam can be changed so as to shift the transmitted portion of the beam toward longer or shorter wavelengths as the filter is tilted. For example, a tilt of about 5° to 10° will cause a shift in the transmitted light of about 20-25 nm. In this way, the single tiltable dichroic filter could be used to replace the two separate filters for each color.

In still another alternative for achieving the desired modulation of the peak transmittance of the printing light, instead of the two sets of blue, green and red filters, a pair of complimentary filters can be used for each color to remove a narrow band of wavelengths from the light at the peak absorption of the yellow, magenta and cyan image dyes.

Figure 7:
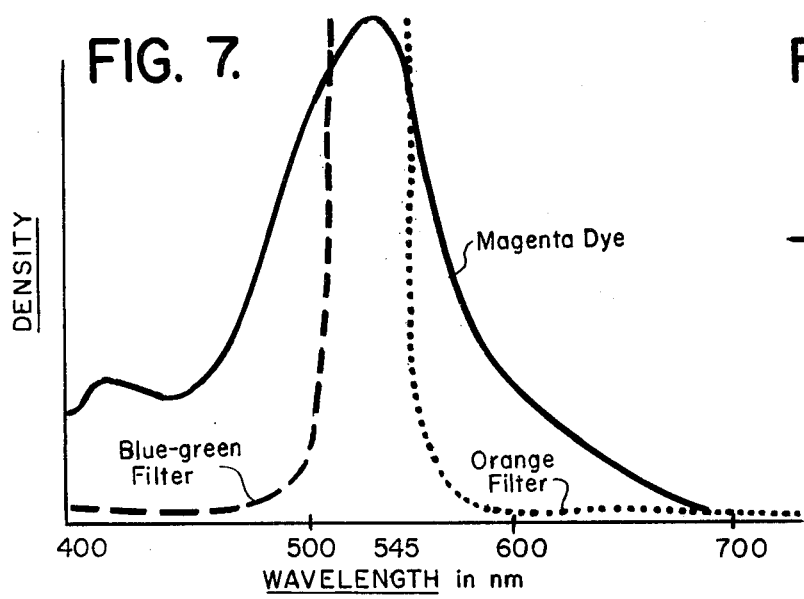
FIG. 7 is a graphic representation of notch filtering to achieve light modulation according to the invention.

For example, as shown in FIG. 7, a combination of a blue/green and orange filters for a given spectral density characteristic for a magenta dye, can effectively cut out the wavelength band from about 500 to 545 nm where the magenta dye has a peak absorption. By utilizing equivalent pairs of blue and yellow filters and cyan and red filters, one can achieve the corresponding notch filtering in the peak absorption bands of the yellow and cyan image dyes, respectively. It can be clearly seen that as a result of such filtering, the peak transmittance of printing light has been modulated as far as each of the film dyes are concerned.

Figure 9:
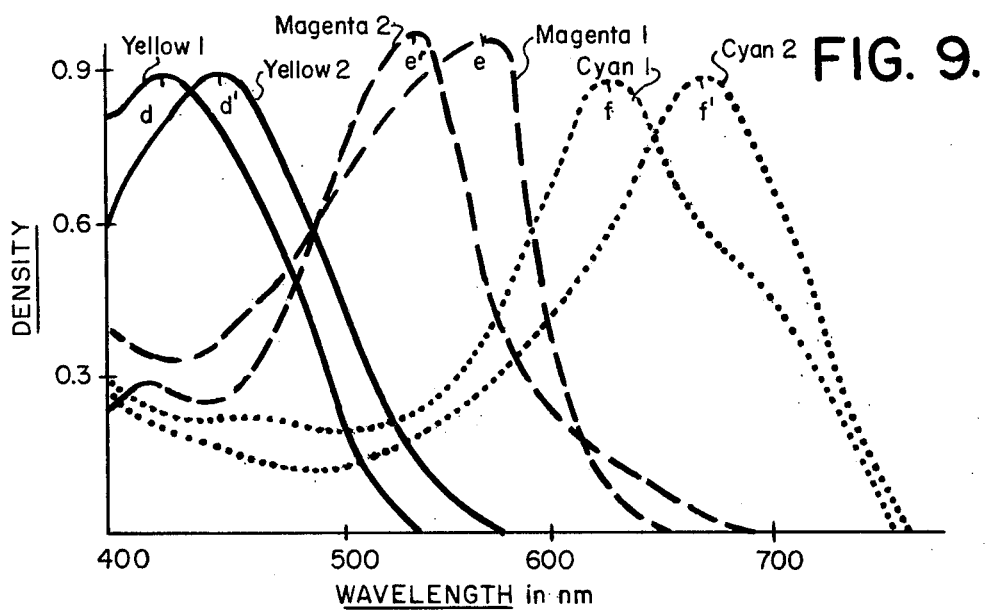
FIG. 9 is a graphic representation of a spectral densities of film dyes for film according to the invention.

As is shown in FIG. 9, the system and process of the present invention can also be carried out by providing color film material having multiple layers, including two blue, two green and two red sensitive layers, each containing a dye of different peak density. Thus two different yellow dyes could be employed, one incorporated in one blue sensitive layer and the other in the second blue sensitive layer and the two layers of each pair having inherently different contrast. This is clearly set forth in FIG. 9 wherein the spectral density curves are shown for the multiple layers, wherein the yellow dyes have the peak absorbtances at d, d' corresponding to 425 and 450 nm, the magenta dyes have the peak absorbtances at e, e' corresponding to 565 and 525 nm and the cyan dyes have the peak absorbtances at f, f' corresponding to 625 and 665 nm.

In the printing process, the printer filter can be matched to the peaks d, d', e, e' and f, f' respectively so that the individual layers can be preferentially sampled thereby.

It will be clear to those skilled in the art that more than two layers can be used for each color and that the filter sets would have the necessary matched transmission characteristics for sampling these additional component images.

Further, it is clear that one or the other of the dye images can be sampled, or combinations of the two can be sampled through the use of color printing filters whose transmittances are matched to the peak points as noted hereinabove and to the other desired combination points.

Figure 10:
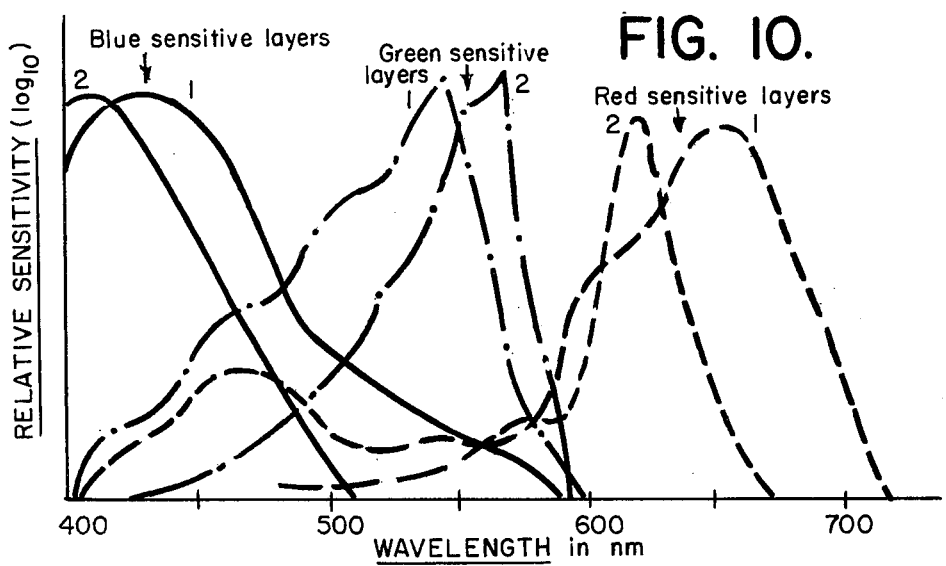
FIG. 10 is a graphic representation of the spectral sensitivities of emulsions in a printing paper according to the invention.

As shown in FIG. 6, the same construction for the printing paper is also contemplated within the scope of the present invention, such that the printing paper is equipped with double or multiple blue sensitive, green sensitive and red sensitive layers, each set having a different peak sensitivity. In FIG. 10, the peak sensitivities of set 1 are near 430, 550 and 670 nm and that of set 2 are near 410, 570 and 625 nm. In accordance with a preferred embodiment of the present invention, the sensitivities of these layers would be adjusted to match the film dye peaks and one of the print material layers for each color would have a low contrast while the other would have a high contrast. Adjustments in the color distribution of the printing light would then control the contrast of the print image. Alternatively, the printing paper alone could have the double layers, while the color film would be of the ordinary type.

It will be appreciated that the instant specification and claims are set forth by way of illustration and not limitation, and that various modifications and changes may be made without departing from the spirit and scope of the present invention.

What is claimed is:

1. In a color photographic printing system wherein blue, green and red light of desired relative intensities is radiated on corresponding yellow, magenta and cyan dyes to obtain a color balanced dye image and including means for selecting a desired contrast for the dye image, the improvement wherein the means for selecting a desired contrast for the dye image comprises means for modulating the wavelength range and the wavelength of the peak transmittances of the blue, green and red light while maintaining their relative intensities with respect to the dyes.

2. The system according to claim 1, wherein the modulating means comprises a light source and at least two filters for each of blue, green and red, wherein each filter has a different peak transmission point for its corresponding color in a region about that of the peak absorption of its corresponding dye.

3. The system according to claim 1, wherein the modulating means comprises a light source and three dichroic filters and means mounting same for selective tilting movement with respect to the light from the light source.

4. The system according to claim 1, wherein the modulating means comprises a notch filter for each of red, blue and green, each filter preventing transmittance of light having a wavelength within a predetermined range about the peak absorption point of the corresponding dye.

5. The system according to claim 1, wherein the modulating means comprises photographic film including at least two blue, green and red sensitive layers, each having a corresponding dye having a different peak density and each having a different inherent contrast and means for sampling both layers for each color during printing.

6. The system according to claim 5, wherein the sampling means comprises filters having transmittances matched to the peak absorption densities of the dyes.

7. The system according to claim 5, wherein the modulating means further comprises printing paper including at least two blue, green and red sensitive layers each having a different peak sensitivity and thereby yielding a different image contrast when one or the other dye image of the color film is reproduced.

8. In a process for color photographic printing wherein yellow, magenta and cyan dyes are irradiated with blue, green and red light of desired relative intensities to obtain a color balanced dye image and a desired contrast is selected for the dye image, the improvement wherein the step of selecting the contrast comprises modulating the wavelength range and the wavelength to the peak transmittances of the blue, green, and red light while maintaining the relative intensities with respect to the dyes.

9. The process according to claim 8, wherein the step of modulating comprises providing at least two filters for each of blue, green and red, wherein each filter has a different peak transmission for the corresponding color in a region about that of the peak absorption of its corresponding dye and irradiating the dyes with the light passing through at least one filter for each color.

10. The process according to claim 8, wherein the step of modulating comprises providing three dichroic filters and tilting the filters with respect to light radiated thereon to vary the spectral distribution of the light transmitted thereby.

11. The process according to claim 8, wherein the step of modulating comprises filtering out a band of wavelengths for each of the blue, green and red light about the peak absorption point of the corresponding dye.

12. The process according to claim 8, wherein the step of modulating comprises providing photographic film with at least two blue, green and red sensitive layers each having a corresponding dye with a different peak density and sampling both layers for each color during printing.

13. The process according to claim 12, wherein the step of sampling comprises providing filters having transmittances matched to the peak densities of the image dyes and sampling the layer with the corresponding filter.

14. The process according to claim 13, wherein the step of modulating comprises providing printing paper with at least two blue, green and red sensitive layers each having a different peak sensitivity which is matched to the peak density of a dye in the film and selectively activating the printing paper layers with the appropriately filtered light.

* * * * *